United States Patent [19]
Scavone et al.

[11] Patent Number: 4,789,554
[45] Date of Patent: Dec. 6, 1988

[54] HIGH TEMPERATURE VACUUM STEAM DISTILLATION PROCESS TO PURIFY AND INCREASE THE FRYLIFE OF EDIBLE OILS

[75] Inventors: Timothy A. Scavone, Maineville, Ohio; James L. Braun, deceased, late of Cincinnati, Ohio, by Pauletta Mary Braun, legal representative

[73] Assignee: The Procter & Gamble Company, Cincinnati, Ohio

[21] Appl. No.: 927,586

[22] Filed: Nov. 14, 1986

Related U.S. Application Data

[63] Continuation-in-part of Ser. No. 804,718, Dec. 5, 1985, abandoned.

[51] Int. Cl.$^4$ .............................................. C11B 3/00
[52] U.S. Cl. .................................... 426/417; 260/420; 260/428; 426/486; 426/487; 426/488; 426/601
[58] Field of Search ............... 426/486, 417, 487, 601, 426/488; 260/420, 428

[56] References Cited

U.S. PATENT DOCUMENTS

| | | | |
|---|---|---|---|
| 2,122,260 | 6/1938 | Moore et al. | 426/488 X |
| 2,621,191 | 12/1952 | Thurman | 260/409 |
| 2,621,196 | 12/1952 | Thurman | 260/409 |
| 3,542,653 | 11/1970 | Lowrey et al. | 202/159 X |
| 3,933,953 | 1/1976 | Leva | 426/488 X |
| 4,036,865 | 7/1977 | Hartmann et al. | 426/488 X |
| 4,095,963 | 6/1978 | Lineberry | 260/428 X |
| 4,588,745 | 5/1986 | Bessler | 514/552 |

FOREIGN PATENT DOCUMENTS 61-97394  5/1986  Japan .

OTHER PUBLICATIONS

*Encyclopedia of Chemical Technology*, vol. 9, ed. by R. E. Kirk and D. F. Othmer, Interscience Publishers, N.Y., N.Y., 1980, pp. 816–817.
Komoda and Harada, "A Dimeric Oxidation Product of [Gamma]-Tocopherol in Soybean Oil", JAOCS, vol. 46, No. 1, pp. 18–22 (1969).
Patterson, "Bleaching Practices in Europe", JAOCS, vol. 53, No. 6, pp. 339–343 (1976).

*Primary Examiner*—Donald E. Czaja
*Assistant Examiner*—Celine Callahan
*Attorney, Agent, or Firm*—Gary M. Sutter; Rose Ann Dabek; Richard C. Witte

[57] ABSTRACT

Deaerated oil having a level of less than about 0.10% by volume of dissolved oxygen is heated at a temperature between about 530° F. (277° C.) and about 650° F. (343° C.) and stripped with a stripping medium with a molar ratio of stripping medium to oil of between about 0.05 and about 9.7, at an absolute pressure of between about 0.5 mm Hg and about 50 mm Hg., for a time of between about 5 seconds and about 15 minutes. The combination of stripping parameters is selected so that the stripping factor "f" is greater than about 0.6, where $f = KP_vS/PO$, where K is between about 1 and about 200, and where $P_v$ (the vapor pressure of the component to be stripped) is not more than about 0.1 mm Hg at 500° F. (277° C.) and not more than about 2.0 mm Hg at 600° F. (343° C.). This vacuum steam stripping at very high temperatures for short residence times improves the frylife of the edible oil while minimizing undesirable thermally induced side reactions such as polymerization, trans-isomerization and hydrolysis.

23 Claims, No Drawings

HIGH TEMPERATURE VACUUM STEAM DISTILLATION PROCESS TO PURIFY AND INCREASE THE FRYLIFE OF EDIBLE OILS

RELATED APPLICATION

This is a continuation-in-part application of Ser. No. 804,718, filed Dec. 5, 1985, (now abandoned).

FIELD OF THE INVENTION

The field of this invention is the processing of edible fats and oils.

BACKGROUND OF THE INVENTION

This invention relates to a process for increasing the frylife of edible oil. The process involves heating the oil at very high temperature under vacuum for a short time while stripping the oil with steam or inert gas to remove components from the class of tocopherols, tocotrienols, sterols (preferably cholesterol), trace pesticides and other trace quinone-type structures, herein described as materials deleterious to frylife.

In order to build superior taste into edible oil products, they must undergo certain processing steps. The most important, from a finished flavor standpoint, is deodorization. Deodorization is a moderately high temperature vacuum steam distillation process used to remove volatile odoriferous compounds from edible fats and oils. These odoriferous compounds are more volatile than the fats and oils, so they can be separated by use of a stripping agent such as steam. High temperature and low pressure increase the relative volatility of these compounds. Since the senses of taste and smell are closely linked, deodorization improves the flavor of the product as well as the odor. The finished product is ideally a bland oil.

The earliest used fats and oils did not require deodorization. Animal fat or lard in its natural form has a desirable taste and odor. Olive oil also has a very agreeable flavor. However, in later years other vegetable oils came into use which had such poor flavor and odor that they were inedible without further processing. In particular, as the cotton industry developed in the United States, there was incentive to use cottonseed oil for edible purposes. The processes of alkali refining and hydrogenation also imparted off-flavors and odors to the oils. Hence, there was a need for the development of deodorization processes to create desirably bland fats and oils.

Deodorization was first practiced by blowing steam through a batch of heated oil. This process significantly improved the odor and flavor of the oil. The next major step was steam stripping used in combination with a vacuum. Use of a vacuum not only enhanced the separation of the volatile odoriferous materials, but it also helped to prevent oxidation of the fats and oils at the high deodorization temperatures. There were many advances in equipment design. Semicontinuous and continuous deodorizers were later developed which enabled the more efficient deodorization of large amounts of fats and oils.

The theoretical aspects of steam stripping are governed by Raoult's law and Dalton's law. T. Applewhite, *Bailey's Industrial Oil and Fat Products*, 1st Ed., Vol. 3, pp. 129-137 John Wiley & Sons, New York (1985) outlines the mathematical relationships involved in deodorization and the influence of different operating variables.

As discussed above, deodorization is more accurately described as a moderately high temperature vacuum steam distillation or steam stripping process, but it was originally called deodorization because of its removal of undesirable odors and flavors. However, the process of this invention amounts to more than simply deodorization, because it is primarily concerned with increasing oil frylife by removing the aforementioned components deleterious to frylife using extreme stripping conditions, while minimizing undesirable thermally induced side reactions. Oil frylife is the amount of time an oil can be used to fry food.

Previous deodorization have not addressed oil frylife. For example, U.S. Pat. No. 2,621,196 to Thurman, issued Dec. 9, 1952, discloses a process for deodorizing edible glyceride oils in which oil is subjected to steam distillation in a plurality of increasing temperatures, starting at a temperature between 395° F. and 450° F. and ending with a temperature between 500° F. and 600° F. Thurman does not discuss frylife. While the final stage temperature of the Thurman process is relatively high, the total deodorization time is more than 1 hour. This is in contrast to the short time of the instant invention.

U.S. Pat. No. 3,933,953 to Leva, issued Jan. 20, 1976, discloses an apparatus and method for stripping fatty acids and removing objectionable odors and flavors from oils and fats. The apparatus is a chamber which encloses a stack of horizontal, parallel disposed plates, each plate having a plurality of apertures defined by chimneys and extending downwardly from the plates. Leva states that the upper limit of temperature for conducting the deodorization is below 575° F. (302° C.) to 600° F. (316° C.). The purpose of the Leva process is to remove fatty acids instead of the materials deleterious to frylife removed in the process of the instant invention. These deleterious materials are much less volatile than fatty acids, so more rigorous processing conditions are needed.

One approach to improving frylife is described in U.S. Pat. No. 3,619,213 to Haynes et al., issued May 22, 1969. A minor proportion of a particular silicon-containing additive is added to a frying fat composition to retard darkening in the frying fat over long periods of frying use. Pyrogenic silica at a 0.05 to 0.7 weight percentage level is a preferred anti-darkening additive.

It is an object of the present invention to provide a process that increases the useful frylife of edible oil without damaging the oil or using additives.

It is another object of this invention to increase the oil's frylife by subjecting it to a process in which dramatic stripping is achieved by heating the oil under vacuum to a very high temperature and held at that temperature for a short period of time, while it is stripped with steam or inert gas.

These and other objects of the invention will become clear from the disclosure herein.

All percentages are by weight unless otherwise defined.

SUMMARY OF THE INVENTION

Deaerated oil having a level of less than about 0.10% by volume of dissolved oxygen is heated at a temperature between about 530° F. (277° C.) and about 650° F. (343° C.) and stripped with a stripping medium with a molar ratio of stripping medium to oil of between about 0.05 and about 9.7, at an absolute pressure of between about 0.5 mm Hg and about 50 mm Hg., for a time of between about 5 seconds and about 15 minutes. The combination of stripping parameters is selected so that the stripping factor "f" is greater than about 0.6, where $f=KP_vS/PO$, where K is between about 1 and about 200, and where $P_v$ (the vapor pressure of the component to be stripped) is not more than about 0.1 mm Hg at 500° F. (277° C.) and not more than about 2.0 mm Hg at 600° F. (343° C.). This vacuum steam stripping at very high temperatures for short residence times improves the frylife of the edible oil while minimizing undesirable thermally induced side reactions such as polymerization, trans-isomerization and hydrolysis.

DETAILED DISCLOSURE OF THE INVENTION

Deep frying is a process of cooking involving the direct transfer of heat from hot fat or oil to cold food. Most restaurants serve foods such as chicken, french fries, and fish which are deep-fried in edible cooking oil. During these frying operations oil is heated in 15–60 lb. kettles to temperatures of approximately 350° F. to 375° F. (175° C. to 190° C.). Food is immersed in the hot oil and fried for varying lengths of time. The oil is reused as subsequent batches of food are cooked. It is thus maintained at high deep-frying temperatures for prolonged periods, often for days.

Browning or caramelization of the surface of the food takes place during cooking. The food absorbs oil during the cooking process, usually about 4–30% by weight of the fried food, depending on type of food, cooking time and temperature. This oil adds a desirable texture to the food and provides a satisfying eating quality and flavor.

The deep frying process also causes chemical changes to occur in the frying oil. The most important changes are: (1) color darkening, (2) oxidation, (3) polymerization, and (4) hydrolysis.

Color darkening is now thought to be caused by two mechanisms. During the frying process various substances are extracted from the food and collect in the oil. These extracted materials can react with the oil and cause it to darken. Another cause of oil darkening is thought to be the oxidation of minor oil components such as tocopherols, tocotrienols, and other quinone-type materials which upon heating in the presence of air from dark brown color bodies. As the oil gets darker with use, the food fried in it darkens more rapidly, eventually reaching the point where the food absorbs too much dark color before it is completely cooked. At this point, the frying oil must be discarded.

In oxidation, oxygen from the air reacts with the oil in the frying kettle. Some of the reaction products are removed from the kettle by the steam which evolves during the frying of the food, but other reaction products remain in the oil and can accelerate the further oxidation of the oil.

Oxidation is accompanied by polymerization. In this process relatively small oil molecules combine to form very large molecules. This results in foaming and gumming. Foaming is the formation of small bubbles which creep slowly up the sides of the kettle. If foaming is too great, this is also a reason to discard the oil since frying cannot be conducted without hazard to the operator. Gumming generally appears along the sides of the kettle or basket where the surface of the oil comes in contact with the air.

Hydrolysis is the reaction of water from the food with the frying oil to form free fatty acids (FFA). The more water in the food, the greater the amount of food which is fried in a given amount of oil, and the higher the temperature, the more free fatty acids that are formed in the oil.

While chemical changes in the oil due to color formation, polymerization and oxidation may each lead to reasons to discard the deep frying oil, changes in color are the predominant reason oil is discarded. Usually the color darkens to an unacceptable level before excessive foaming, gumming or unacceptable oxidative deterioration occurs. Discolored oil can impart objectionable color to the food which makes it difficult for the fry cook to know if the food is undercooked or overcooked, and which is often interpreted by the consumer as indicating that the food is substandard. Cooking oil used in the normal course of business in restaurants and fast food outlets becomes unusable within approximately 3 to 7 days because of excessive discoloration, and it must be replaced. Therefore, there is a need for a method of extending the frylife of cooking oil by a reduction in its rate of darkening.

Frylife of the oil is defined herein spectrophotometrically as the amount of time it takes for a frying oil to darken in color to an absorbance (at 520 nm) of 1.4 after deep-frying foods. (The method is described in detail below.) Surprisingly, it has now been found that a process for dramatically vacuum steam distilling edible oil at very high temperatures for short periods of time purifies the oil, removing materials deleterious to frylife, and results in improving the frylife of the oil while minimizing undesirable thermally induced side reactions during the process. The side reactions include chemical changes in the oil such as polymerization, trans-isomerization, reduced iodine value, decomposition of essential fatty acids, and increase in peroxide value.

It is important to minimize these side reactions because they can have detrimental effects on the resulting oil. One undesirable side reaction is polymerization. With additional heating more polymerization occurs, and dimers and trimers of triglycerides are produced, along with dimers of fatty acids. This is undesirable because it lowers the level of triglyceride and the organoleptic and cooking responses of the oil are not normal.

Another side reaction is the decomposition of essential fatty acids through hydrolysis. The fatty acid portion of the triglyceride is broken at the double bond. Hence, the level of essential fatty acids is reduced since the fatty acid has been decomposed. In addition, precursors are created that lead to poor flavors and colors. Trans-isomerization is another possible side reaction. The cis bonds in the triglycerides can be converted to trans bonds. This increases the melting point of the triglycerides and can thereby produce a cloudy-colored oil. Also, trans-isomers have different metabolic effects, and are not considered essential fatty acids.

It has now been discovered that improvement in frylife of processed oil is dependent on the removal of those materials deleterious to frylife and that using dramatic stripping to remove those components results in improved frylife. Using high temperature is the most efficient means to achieve this dramatic stripping. In contrast, the development of higher molecular weight materials and other undesirable side reactions was found to be most dependent on residence time of the oil at high temperatures rather than sensitive to temperature alone. Hence, vacuum steam distilling using extreme stripping parameters at very high temperatures for very short residence times has been discovered to result in frylife improvements with a minimum of side reactions.

Briefly, standard deodorization is accomplished when the volatile odoriferous components in a fat or oil are removed as well as when the free fatty acids are lowered from approximately 0.08% to 0.02%. The theoretical relations which govern the continuous deodorization process are as follows:

$$\frac{V_1}{V_2} - 1 = \frac{KP_vS}{PO}$$

where:
- K = an experimentally determined coefficient. In general, using similar packed column continuous deodorization equipment, values for K of about 4 for free fatty acid deodorization and values for K of about 65 for removal of materials deleterious to frylife have been observed. Regardless of the equipment, the relative values should remain constant (e.g. 65/4). In equipment where the steam and oil contacting is not as efficient, such as in a thin film evaporator, K values for materials deleterious to frylife as low as 1.0 have been observed. In contrast, in equipment where contacting efficiency is extremely efficient, K values as high as about 200 have been observed for materials deleterious to frylife.
- $P_v$ = vapor pressure of the pure component to be removed.
- S = molar steam rate.
- P = absolute pressure.
- O = molar oil rate.
- $V_1$ = initial molar concentration in the oil of the component to be removed.
- $V_2$ = final molar concentration in the oil of the component to be removed.

The stripping factor, f, is defined as $$f = \frac{V_1}{V_2} - 1 = \frac{KP_vS}{PO}$$

The stripping factor is a measure of the amount or strength of the stripping. More extreme conditions are needed to remove components of low vapor pressure in the oil than are needed for components of higher vapor pressure. In a typical deodorization process, the combination of temperature (as it influences free fatty acid vapor pressure), pressure, steaming rate and oil rate are fixed so that the combination results in a stripping factor of 3, the desired level of stripping to remove fatty acids.

In contrast, the components that have now been found to be detrimental to frylife require much stronger stripping conditions. The stripping factor must be greater than about 0.6 for materials of much lower vapor pressure than that of fatty acids. Such dramatic stripping conditions are required because the components now thought to be deleterious to frylife, components from the group of tocopherols, tocotrienols, sterols (preferably cholesterol), trace pesticides, and other trace quinone-type structures, have low vapor pressures in oil of not more than about 0.1 mm Hg at 500° F. (277° C.) and not more than about 2 mm Hg at 600° F. (343° C.).

Specifically, the present invention is a process for treating edible oil comprising: (a) deaerating oil to a level of less than about 0.10% by volume of dissolved oxygen; then (b) heating the deaerated oil at a temperature between about 530° F. (277° C.) and about 650° F. (343° C.), at an absolute pressure between about 0.5 mm Hg and about 50 mm Hg, for a time period of between about 5 seconds and about 15 minutes, while stripping the oil with a stripping medium with a molar ratio of stripping medium to oil of between about 0.05 and about 9.7. The combination of stripping parameters is selected so that the stripping factor "f" is greater than about 0.6, where $f = KP_vS/PO$. As explained above, K is between about 1 and about 200 for the removal of materials deleterious to frylife. $P_v$ is the initial vapor pressure in oil of the materials deleterious to frylife as disclosed above. The process can improve frylife up to about 50% over conventionally deodorized oils.

The process of the instant invention can be contrasted with the process of U.S. Pat. No. 3,933,953 to Leva. In the Leva patent, high temperatures are cited in the invention wherein the combination of stripping parameters according to the usual chemical engineering principles results in oil deodorizing and/or steam refining. Oil deodorizing is the removal of volatile odoriferous components and the lowering of free fatty acids from about 0.08% to 0.02%, while steam refining is the lowering of free fatty acids from about 3% to 1%. Using the usual chemical engineering principles demonstrates that the object of the present invention is not achieved in the Leva process, since these components deleterious to frylife are not incidentally removed to a sufficient level to result in a stripping factor greater than about 0.6, despite the high operating temperatures of Leva. This is because those components deleterious to frylife are much less volatile and require dramatic stripping relative to simple deodorization or steam refining, to achieve improved frylife. This is demonstrated below:

$$\frac{\text{Stripping factor relative to free fatty acids}}{\text{Stripping factor relative to materials deleterious to frylife}} = \frac{f_f}{f_d} = \frac{\frac{K_f P_{vf} S}{PO}}{\frac{K_d P_{vd} S}{PO}}$$

The parameters of S, P, O are the same in both instances and thus cancel; and $$\frac{f_f}{f_d} = \frac{P_{vf}}{P_{vd}} \cdot \frac{K_f}{K_d}$$

$$f_d = f_f \frac{P_{vd}}{P_{vf}} \cdot \frac{K_d}{K_f}$$

Typical approximate vapor pressure of free fatty acids and materials deleterious to frylife are listed below:

| | Vapor Pressure (mm Hg) | |
|---|---|---|
| Temperature (°F.) | Fatty Acids | Components Deleterious to Frylife |
| 400 | 2.5 | 0.0020 |
| 440 | 7.5 | 0.011 |
| 500 | 50 | 0.10 |
| 600 | 318 | 2.0 |

Thus, even at 600° F., the stripping factor, relative to materials deleterious to frylife, is $$f_d = 3.0 \times \frac{2.0}{318} \times \frac{65}{4}$$
$$= 0.31$$

and the concentration of materials deleterious to frylife has only been lowered by about 24%.

$$f_d = \frac{V_1}{V_2} - 1$$

$$V_2 = 0.76 \, V_1$$

Thus, the use of typical deodorizing conditions, even at high temperatures, results in a stripping factor for materials deleterious to frylife of about 0.31. The object of the present invention is to provide a stripping factor for materials deleterious to frylife of about 0.6 or greater.

Starting materials suitable for use in the process of the present invention comprise edible fats and oils and mixtures thereof. Any of a variety of glyceride-based oil materials can be used in the present invention provided that the solids content is such as to be suitable for use in cooking foods. The present process can be used any time after refining the oil or as part of a steam refining process. In addition, the starting oil can be processed with one or more of the following processes: hydrogenation, winterization, dewaxing, interesterification, etc. These are well-known processes and will not be described herein. Specific reference to such treatments can be found in D. Swern, *Bailey's Industrial Oil and Fat Products*, 3rd Ed., Interscience Publishers, New York (1964).

The term "oil" as used herein shall refer to edible fats and oils comprising triglycerides, fatty acids, fatty alcohols, and esters of such acids and alcohols. Especially appropriate for use in the present invention are triglycerides of straight chain or branched chain, saturated or unsaturated, monocarboxylic acids having from 10 to 28 carbon atoms. Suitable sources of such oils are: (1) vegetable fats and oils such as soybean, corn, sunflower, rapeseed, low erucic acid rapeseed, canola, cottonseed, olive, safflower, sesame seed, nasturtium seed, tiger seed, ricebran, wallflower, and mustard seed; (2) meat fats such as tallow or lard; (3) marine oils such as menhaden, pilcherd, sardine, whale or herring; (4) nut fats and oils such as coconut, palm, palm kernel, babassu kernel, or peanut; (5) milkfat, butterfat; (6) cocoa butter and cocoa butter substitutes such as shea, or illipe butter; and (7) synthetic fats.

The preferred starting materials are edible polymorphic vegetable oils, and mixtures thereof, comprising triglycerides having saturated or unsaturated acyl groups predominately in the range of from 12 to 24 carbon atoms such as lauroyl, lauroleoyl, myristoyl, myristoleoyl, palmitoyl, palmitoleoyl, stearoyl, oleoyl, linoleoyl, arachidoyl, arachidonoyl, behenoyl, erucoyl, and the like. Branched chain saturated or unsaturated acyl groups are also useful herein. Nut oils such as palm oil and peanut oil are also preferred.

A stabilizer can be employed herein to help protect against oxidative deterioration at high temperatures. Silicone oils, particularly methyl and ethyl silicones, are useful for this purpose. Methyl silicones have also proven effective in reducing the rate of oil polymerization during deep frying. In the present invention it is appropriate to employ the silicone at a level of 0 to 10 parts per million (ppm) by weight, and 1 to 5 ppm by weight is preferred. The silicone is added to the starting material after completion of the refining and bleaching processes.

Various other additives can be used herein provided that they are edible and aesthetically desirable and do not have any detrimental effects on the oil. The types of additives employed should be consistent with the ultimate end use of the oil, deep-fat frying. The process of the present invention is used to prepare oils which can normally contain minor amounts of optional flavorings, emulsifiers, anti-spattering agents, anti-sticking agents, anti-oxidants, or the like.

Before the oil is exposed to the high processing temperatures, it must first be deaerated to a level of less than about 0.10% by volume of dissolved oxygen, and preferably less than about 0.05%, in order to prevent oxidation of the oil by dissolved oxygen. "Dissolved oxygen" is oxygen which becomes associated with the oil when it is exposed to the air or other oxygen-containing material, and can comprise up to about 2.5% by volume of a typical edible oil at room temperature.

Preferably, deaeration is accomplished by heating the oil and then subjecting the heated oil to a partial vacuum of about 50 mm Hg or less, preferably between 5 and 20 mm Hg. The vacuum is maintained during the subsequent preheating step. The temperature to which the oil is heated should not be so high as to damage the oxygen-containing oil. For example, soybean oil which is saturated with air at room temperature contains about 2.5% dissolved oxygen. This oil can safely be heated to about 220° F. (104° C.) without degradation.

Deaeration can also be accomplished by sparging, i.e., bubbling inert gas such as nitrogen through the oil. (In such a case a vacuum of about 50 mm Hg or less is still used during the subsequent preheating step.)

After the oil has been deaerated, it is preheated under vacuum from a temperature below about 480° F. (249° C.) to a temperature between about 530° F. (277° C.) and about 650° F. (343° C.), preferably between about 550° F. (288° C.) and about 630° F. (332° C.). This preheating is conducted at an absolute pressure of less than about 50 mm Hg, and over a time period of less than about 15 minutes, preferably less than about 5 minutes, and most preferably less than about 3 minutes. The oil is heated quickly from lower temperatures to the distillation temperature to avoid an increase in side reactions in the oil which occur at about 480° F. (249° C.) and above.

Next, the oil is subjected to the very high temperature vacuum steam distillation process of this invention. This process comprises stripping the oil with a stripping medium such as steam, at a very high temperature, for a short period of time, under a vacuum, such that the stripping factor relative to those materials deleterious to frylife exceeds about 0.6. A vacuum of between about 0.5 mm Hg and about 50 mm Hg is maintained during the distillation process to prevent oxidation of the oil at the high processing temperatures. Preferably the vacuum will be between about 5 mm Hg and about 20 mm Hg.

During the high temperature vacuum steam distillation process, the oil is at a temperature between about 530° F. (277° C.) and about 650° F. (343° C.), and preferably between about 550° F. (288° C.) and about 630° F. (332° C.). The high temperature range of the process of this invention is critical to the processing efficiency for achieving the improved frylife benefits. Other possible operable ranges are from about 570° F. (299° C.) to about 650° F. (343° C.), and from about 605° F. (318° C.) to about 650° F. (343° C.).

The high temperature distillation process continues for a time between about 5 seconds and about 15 minutes. Preferably the distillation time will be between about 1 minute and about 5 minutes. In order to gain the frylife benefits of increased temperatures while minimizing undesirable side reactions, higher processing temperatures must be combined with shorter processing times, and vice versa. The following Table give an approximation of some suitable combinations of times and temperatures.

TABLE 1

| Temperature | Time |
| --- | --- |
| 550° F. (288° C.) | less than about 15 min. |
| 600° F. (316° C.) | less than about 5 min. |
| 650° F. (343° C.) | less than about 1 min. |

Preferred temperature and time combinations are as follows: between about 530° F. (277° C.) and about 560° F. (293° C.) for not more than about 15 minutes; between about 560° F. (293° C.) and about 600° F. (316° C.) for not more than about 5 minutes; and between about 600° F. (316° C.) and about 650° F. (343° C.) for not more than about 1 minute.

While under vacuum and at high temperature, the oil is stripped with a stripping medium. The molar ratio of stripping medium to oil is between about 0.05 and about 9.7. The total amount of stripping medium used during the stripping process is from about 0.1% to about 20% by weight of the oil. Preferably, there should be about 0.5% to about 3% stripping medium by weight of the oil. The more efficient the deodorization system, the less stripping medium will be needed. As used herein, "stripping" refers to the removal of relatively volatile components from the oil by passage of a stripping medium through the oil, and the "stripping medium" is the steam or gas passed through the oil to perform the stripping. Steam is highly preferred as the stripping medium because it is readily available in high purity and because it does not injure the oil being processed. Other agents can be used, for example, gases which are inert under the conditions of the process, such as nitrogen, helium or hydrogen. Oxygen and air are unsuitable, however, as they would cause oxidation and degradation of the oil. The parameters of $KP_vS/PO$ are combined such that the ratio, f, exceeds 0.6. The result is the concentration of materials deleterious to frylife being reduced by 37.5% or more.

After the process is complete, the oil is rapidly cooled to a temperature below about 480° F. (249° C.) to avoid an increase in side reactions in the oil which occur at about 480° F. (249° C.) and above. Preferably the oil is cooled rapidly to a temperature of from about 370° F. (188° C.) to below about 480° F. (249° C.) in less than about 1 minute.

The type of equipment used for the process of this invention depends mainly on the need for a relativey short residence time for the oil. Preferred equipment provides a high surface area between the oil to be processed and the stripping medium to promote efficient stripping. Batch, semicontinuous, or continuous deodorization equipment can be used. A batch reactor is least preferred because the cycle time may be too long to avoid damaging the oil at the high temperatures used in this process. Continuous deodorizers are most preferred from the viewpoint of economics, and the residence time can be easily adjusted.

An example of a continuous deodorizer is that described in U.S. Pat. No. 3,542,653 to Lowrey et al., issued Nov. 24, 1970. This deodorizer apparatus contains a packed deodorization chamber in its center, which is surrounded by and shares a common wall with an annular heat-bleaching chamber. Hot oil to be heat-bleached and deodorized is fed into the lower portion of the heat-bleaching chamber and is forced upward by the addition of new oil. After the oil reaches the top of the heat-bleaching chamber, it is transferred to the top of the central packed deodorization chamber into which it flows downward and is deodorized by contact with a countercurrent stream of hot steam.

T. Applewhite, *Bailey's Industrial Oil and Fat Products*, 1st, Ed., Vol. 3, pp. 137–156, John Wiley & Sons, New York (1985), discusses the design and operation of deodorization equipment. It is stated that virtually all modern deodorizers use multistage steam ejectors with barometric intercondensors to maintain vacuum. While there are many methods of heating the oil, the method now used almost exclusively is the Dowtherm system. Dowtherm is a eutectic mixture of diphenyl and diphenyl oxide, and it has a boiling point of 495.8° F. (257.7° C.) at atmospheric pressure and 560° F. (293° C.) at only 16.1-pounds gage pressure; hence by using its vapors for heating, adequate temperatures are achieved at low pressures.

The materials used for deodorizer construction are important. At the high temperatures used in this process, ordinary steel acts as a pro-oxidant for the oil; hence it is desirable to use a deodorizer made of a metal such as nickel or stainless steel, or an appropriate alloy.

Applewhite also discusses batch and continuous deodorizers. He states that the conventional batch deodorizer is a vessel in the form of a vertical cylinder with dished or cone heads. The stripping steam is injected in the bottom of the vessel through a distributor, which usually consists of a flat "spider" of perforated pipes radiating from a central steam delivery line.

In semicontinuous deodorizers, the oil is deodorized in separate and discrete portions, even though the action is essentially continuous. In a typical semicontinuous deodorizer, successive charges of oil are dropped from a measuring tank into a series of superimposed nickel trays supported within a carbon steel shell, with the oil remaining for one-half hour in each tray. In the top tray the oil is deaerated and heated to approximately 330° F. (166° C.). with steam; in the second tray it is heated to operating temperature with Dowtherm vapor; in the third and fourth trays it is subjected to stripping (a small amount of steam is also injected into the other trays, for deaeration and agitation); and in the bottom tray it is cooled before it is pumped through a pressure filter to storage.

One type of continuous deodorizer is said to utilize an external deaerator of the flash type and a heat-exchange system. The hot feed oil follows a tortuous path through narrow passageways in three square superimposed nickel trays. An arrangement of "splash baffles" is relied upon to retain the oil and disperse the oil and steam sufficiently to obtain the high vaporization efficiency in the shallow (9-inch) layer of oil. Another type utilizes countercurrent flow of oil and steam and is fully automatic.

Various other types of gas/liquid contacting equipment that are suitable for the process of the present invention are discussed in Perry et al., *Perry's Chemical Engineer's Handbook*, 6th Ed., pp. 18-3 to 18-57, McGraw-Hill, New York (1984). These include plate columns (both crossflow and counterflow) and packed columns. A typical packed column consists of a cylindrical shell containing a support plate for different kinds of packing material and a liquid-distributing device designed to provide effective irrigation of the packing. Typical packings include Raschig rings, Lessing rings, Berl saddles, Intalox saddles, Tellerettes, Pall rings and structural-type packing.

Liquid-dispersed contactors can also be used in this process. Spray devices are the most common type of liquid-dispersed gas/liquid contactors, and these include nozzle droplet formers and disc atomizers. A second type is the baffle-plate or shower-deck column. Three types of spray systems are in common use: the spray column, the cyclonic spray, and the venturi scrubber. Wetted-wall or falling-film columns are another type of equipment that can be used. These include falling film and rising film reactors.

Preferred equipment for use with the present invention are packed columns, thin film reactors, wiped film evaporators, falling film evaporators, and rising film evaporators. Semicontinuous deodorizers are also preferred.

The frylife benefits of the present invention are demonstrated by the results in Table 2. Sample 1 was deodorized at 480° F. (249° C.) for 2 minutes, using 13.6 mm Hg vacuum and 0.75% by weight stripping steam and a packed column continuous deodorizer unit. Sample 2 was deodorized at 525° F. (274° C.) for 3 hours, using 5.4% stripping steam and a batch deodorizer modified for rapid heating. Sample 3 was stripped according to the process of the present invention at 550° F. for 60 seconds, using 0.5% stripping steam, 7 mm Hg vacuum, and a packed column continuous deodorizer.

TABLE 2

| Sample | Temperature | Time | f | Frylife | High MW Materials |
|---|---|---|---|---|---|
| 1 | 480° F. (249° C.) | 2 min. | 0.081 | 5.6 days | 0.4% |
| 2 | 525° F. (274° C.) | 3 hrs. | 1-2 | 6.6 days | 7.9% |
| 3 | 550° F. (288° C.) | 60 sec. | 2.5 | 6.7 days | 0.4% |

The Table illustrates that only Sample 3, the sample prepared by the instant process, had a long frylife (6.7 days) and a low level of high molecular weight materials (0.4%, by weight of the oil). These benefits were achieved by stripping the oil at a very high temperature, combining the stripping parameters of temperature, pressure and steam to result in a stripping factor greater than 0.6 using a short residence time at the high temperature.

Sample 1 was deodorized at a typical deodorization temperature (480° F., 249° C.) using stripping parameters which result in a stripping factor of 0.081, for a short time (2 min.), and it had a low level of high molecular weight materials, but its frylife was only 5.6 days. Sample 2 was deodorized at a somewhat higher temperature (525° F., 247° C.) and using stripping parameters which result in a stripping factor of about 1 to 2, for a long stripping time (3 hours). This sample had an improved frylife (6.6 days) but the high molecular weight materials were at an unacceptably high level (7.9%).

The process of the instant invention presents advantages in the areas of economics, food appearance and food taste. The restaurant owner receives an economic benefit from the oil's longer frylife since the oil remains suitable for cooking longer. Food taste can be improved as well. As oil darkens, a cook may adjust frying time so that the food is cooked to the correct color. If the oil gets darker more slowly, it is easier for the cook to control the frying endpoint. Foods will be more uniform in color and more uniformly cooked, and it will be easier to avoid overcooking or undercooking of the food. There is also an economic benefit to the manufacturer of the edible oil. A shorter residence time in the high temperature vacuum steam stripping process means that more oil can be produced in the same amount of time, which will give cost advantages to the manufacturer.

TESTING METHODS

A. Method for Measuring Oil Frylife

For purposes of this invention, frylife is defined as the amount of time it takes for the frying oil to darken in color to an absorbance of 1.4 after deep-frying foods according to the following process. Fifteen pounds of oil is put into a deep frying kettle and heated to between 350° F. (177° C.) and 360° F. (182° C.). A total of 62 batches of food are deep-fried in the oil over an 8-hour period during each day. The batches consist of the following: french fries, 24 0.25-lb. batches and 8 1-lb. batches; fish, 5 0.25-lb. batches and 5 1-lb. batches; chicken, 11 0.25-lb. batches and 7 1-lb. batches; and onion rings, 2 0.25-lb. batches. The frequency of each type of food in the 62 batches approximates their frequency of frying in a typical restaurant.

After frying the 62 batches of food over an 8-hour period, the oil in the fry kettle is filtered through a medium porosity cotton filter (pore size: 80 micron diameter; oil flow-through rate: 450 gallons/min./sq. ft.) to remove solid particles accumulated during the day of frying, and then placed back into the fry kettle. A five gram sample of the filtered oil is tested in a spectrophotometer for absorbance at a 520 nm wavelength. The absorbance reading is recorded. This absorbance reading depicts the actual deep fried fat color based on a previously developed correlation of panelist color observations versus spectrophotometric readings at the 520 nm wavelength.

After the absorbance has been measured, sufficient fresh oil is added to the fry kettle to replace the oil lost due to hydrolysis and/or absorption by the food. The oil is topped off to a measured weight of 15 lbs. after each day at the beginning or end of each frying day. The frykettle is allowed to idle for approximately 3-4 hours at the frying temperature.

This process is repeated for a number of days until the absorbance of the oil at 520 nm is 1.4. This is a darkening color endpoint beyond which the oil quality is judged to no longer produce acceptable fried foods. Partial frylife days are estimated through linear regression or linear interpolation, both of which are similar and close approximations of the partial frylife days value.

When the frylife of two oils are compared, the oils undergo the testing simultaneously, side-by-side, using food from the same lots to minimize any difference due to variability in the food. The oils are compared by measuring the number or days each takes to reach the 1.4 absorbance endpoint.

B. Method for Measuring High Molecular Weight Materials

"High molecular weight materials" as defined herein are all materials in the frying oil having a higher molecular weight than the triglycerides in the oil. High performance size exclusion chromatography (HPSEC) is the method used for measuring these materials. HPSEC is a high performance liquid chromatography (HPLC) technique which separates molecules according to their size instead of their bonding properties, as conventional HPLC does.

A 2.5% solution of the sample of frying oil in tetrahydrofuran (THF) is prepared and filtered through a 0.45 micron filter. Twenty microliters of this sample solution is injected into an HPLC system equipped with a pair of HPSEC columns (DuPont Zorbax PSM 60S size exclusion columns of 4.6 mm×25 cm size, DuPont Company Clinical & Instrument Systems Division, Wilmington, DE 19898). The HPLC detector consists of a refractive index detector (RI) which can detect any compound that has an RI value different from that of the mobile phase. THF is the mobile phase. HPSEC conditions: THF flow rate—1.0 ml/min.; injection loop—20 ul; RI detector set at 8X. The sample solution is injected, a chromatogram is obtained, and the peak areas for the high molecular weight materials, the triglycerides, and the low molecular weight materials are obtained.

Calculations:

$$C_{HMW} = \frac{F_{HMW} A_{HMW}}{F_i A_i} \times 100\%$$

where $C_{HMW}$ = concentration of high molecular weight materials $F_{HMW}$ = relative response factor for high molecular weight materials = 1.310

$A_{HMW}$ = area counts for high molecular weight peak $F_i A_i$ = sum of (all relative response factors times their respective area counts)

Response factors are based on Mass Detector (Applied Chromatographic Science, England) response which are correlated to refractive index response. Response factor for triglycerides = 1.000; and for low molecular weight materials = 1.000. Hence, if the chromatogram shows 46,816 area counts for the high MW peak; 12,832,986 area counts for the triglyceride peak; and 186,664 area counts for the low MW peak, the concentration of high MW materials is calculated as follows:

$$C_{HMW} = \frac{(1.310)(46,816)(100)}{(1.310)(46,816) + (1.000)(12,832,986) + (1.000)(186,664)} = 0.47\%$$

EXAMPLE 1

Soybean oil is heat bleached and vacuum steam distilled using the continuous deodorization apparatus described in U.S. Pat. No. 3,542,653 to Lowrey et al., issued Nov. 24, 1970. The apparatus is set up in the same manner as described in the example in the Lowrey et al. patent with the exception that a separate vessel for heat bleaching is used (instead of using an annular heat bleaching unit) and a heating source is installed to heat oil overflowing from the heat bleaching apparatus to the continuous deodorizer to a temperature of from 550° F. (288° C.) to 565° F. (296° C.). The oil prior to entering the equipment has been refined, absorptively bleached with bleaching earth, hydrogenated to an iodine value of 107 and deaerated to a level of about 0.08% by volume of dissolved oxygen.

Oil to be heat bleached, at a temperature of about 480° F. (249° C.), is introduced into the lower portion of the heat-bleaching chamber, below the oil distributor, at a rate of 1000 pounds (about 21 cubic feet) per hour. This provides a residence time of the oil within the heat bleaching chamber of about 11 minutes, during which the oil rises in the separate heat bleaching chamber in approximate plug flow.

After heat bleaching, the oil is forced into a shell and tube heat exchanger in which hot therminol at approximately 650° F. (343° C.) on the shell side heats the soybean oil on the tube side from 480° F. (249° C.) to between 550° F. (288° C.) and 565° F. (296° C.) in less than about 2 minutes. The oil is then forced to the upper portion of the vacuum steam distillation apparatus. The oil is then allowed to flow downward through the packing material, requiring from 1 to 2 minutes to do so. This causes contact of the oil and a countercurrent stream of steam, under a vacuum of approximately 7 mm Hg, in an amount of about 0.5% by weight of the oil, which is introduced into the lower portion of the packed deodorization chamber. The combination of stripping parameters results in a stripping factor of 2.5 and compensates deleterious to frylife are removed through the volatilization of these materials in the oil, while residence time at this high temperature is minimized and few, if any, higher molecular weight materials or other side products form as a result of the high temperature processing. After passing through the packed vacuum steam distillation chamber the oil is immediately quenched to below 370° F. (188° C.). Heat bleached, vacuum steam distilled and quenched oil is withdrawn from the lower portion of the packed vacuum steam distillation chamber, while steam and volatilized components deleterious to frylife are withdrawn from the upper portion of the packed vacuum steam distillation chamber through the oil entrainment separator and vapor line to the steam ejector system.

The resultant oil using this process has a frylife of about 6.7 days, while oils processed using the same equipment (and thus same processing time) at conventional process temperatures (i.e. 480° F., 249° C.) and an f value of 0.081 has a frylife of about 5.6 days. Both the conventionally processed oil and the oil processed according to the present invention have levels of higher molecular weight materials comparable to commercial fats and oils and less than about 2% by weight.

EXAMPLE 2

Soybean oil is vacuum steam distilled according to the process described in Example 1, except that the distillation temperature is about 650° F. (343° C.), the vacuum is 10 mm Hg, the stripping steam is 0.25% by weight of the oil, the f value is 12, and the distillation time is about 15 seconds. The resultant oil has a frylife of about 8.3 days, in contrast to the 5.6 day frylife of the oil processed at 480° F. (249° C.) and an f value of 0.081 using the same equipment. Both oils have levels of higher molecular weight materials comparable to commercial fats and oils and less than about 2% by weight.

EXAMPLE 3

A soybean oil blend is vacuum steam distilled using a falling film evaporator which has been modified such that steam may be continuously sparged through an entry port at the bottom of the vessel. The oil blend, containing 96% oil hydrogenated to an iodine value of 107 and 4% oil hydrogenated to an iodine value of 8, has been refined, absorptively bleached with bleaching earth, hydrogenated, and deaerated to a level of about 0.08% by volume of oxygen.

Oil to be vacuum steam distilled at a temperature of about 590° F. (310° C.) is introduced into the upper portion of the evaporator at a temperature of 500° F. (260° C.) and a rate of 140 pounds per hour. The evaporator in design is a hollow vertical tube in which is placed a concentric finned shaft with a fixed clearance to the wall of the tube of 30/1000 of an inch. This shaft rotates at a tip speed of about 30–50 feet per second. Surrounding the evaporator is a jacket through which Therminol 66 at a temperature of about 650° F. (343° C.) is circulated to heat the incoming oil from 500° F. (260° C.) to 590° F. (310° C.) as the oil flows down the wall of the evaporator. At the bottom of the evaporator is a port through which steam at a rate of 14 pounds per hour (10% stripping steam to oil ratio by weight) is injected. The steam along with volatile components deleterious to frylife are removed through the top of the evaporator through an ejector system which maintains the evaporator under a vacuum of about 3–5 mm Hg. The oil is withdrawn from the bottom of the vessel by a pump which maintains a liquid oil level to maintain the system vacuum. The ratio of stripping parameters result in a stripping factor of approximately 1.8. The total residence time in the evaporator is less than about 30 seconds, while the residence time at 590° F. (310° C.) is at or below about 15 seconds.

The resultant oil using this process has a frylife of about 6.6 days and a level of higher molecular weight materials of less than about 1%, while oils processed using conventional process equipment at conventional temperatures and a stripping factor f of 0.081, as outlined in Example 1, have a frylife of from about 5.6 days and a comparable level of higher molecular weight materials.

What is claimed is:

1. A process for removing compounds selected from the group consisting of tocopherols, tocotrienols, sterols, cholesterol, trace pesticides, and quinone-type structures which are deleterious to frylife from edible oil comprising:
   (a) deaerating the oil to a level of less than about 0.1% by volume of dissolved oxygen;
   (b) heating the deaerated oil to a temperature between 550° F. (288° C.) and 650° F. (343° C.), at an absolute pressure of between 0.5 mm of mercury and 20 mm mercury, for a time period of between 5 seconds and 15 minutes, while stripping the oil with a stripping medium with a molar ratio of stripping medium to oil of between 0.05 and 9.7; wherein the combination of stripping parameters is selected so that the stripping factor "f" is greater than 0.6, where $f=KP_vS/PO$; and wherein K is between about 1 about 200, and $P_v$ (the vapor pressure of the component to be stripped) is not more than about 0.1 mm mercury at 500° F. (260° C.) and not more than 2 mm of mercury at 600° F. (316° C.); wherein the product of the process contains less than 2% high molecular weight materials and more than 37½% of said compounds deleterious to frylife have been removed.

2. A process according to claim 1 wherein the oil is stripped for not more than about 15 minutes at a temperature between 550° F. (277° C.) and about 560° F. (293° C.).

3. A process according to claim 1 wherein the oil is stripped for not more than about 5 minutes at a temperature between 560° F. (293° C.) and about 600° F. (316° C.).

4. A process according to claim 1 wherein the oil is stripped for not more than about 1 minute at a temperature between 600° F. (316° C.) and about 650° F. (343° C.).

5. A process according to claim 1 wherein from about 0.5% to about 3% stripping medium by weight of the oil is used.

6. A process according to claim 1 wherein the oil is heated and stripped at an absolute pressure of between about 5 mm Hg and about 20 mm Hg.

7. A process according to claim 6 wherein the stripping medium is steam.

8. A process according to claim 1 wherein the process is a continuous process.

9. A process according to claim 1 wherein the edible oil is a vegetable oil.

10. A process according to claim 9 wherein the edible oil is selected from the group consisting of soybean oil, corn oil, sunflower seed oil, palm oil, peanut oil, rapeseed oil, and low erucic acid rapeseed oil, and mixtures thereof.

11. A process for removing compounds selected from the group consisting of tocopherols, tocotrienols, sterols, cholesterol, trace pesticides, and quinone-type structures which are deleterious to frylife from edible oil comprising:
   (a) deaerating the oil to a level of less than about 0.10% by volume of dissolved oxygen; then
   (b) preheating the oil from a temperature below about 480° F. (249° C.) to a temperature between 530° F. (277° C.) and 650° F. (343° C.) at an absolute pressure of less than about 50 mm Hg over a time period of less than about 15 minutes; then
   (c) stripping the heated oil with a stripping medium with a molar ratio of stripping medium to oil of between 0.05 and 9.7, at an absolute pressure of between 0.5 mm Hg and 20 mm Hg and at a temperature between 550° F. (288° C.) and 650° F. (316° C.), for from 5 seconds to 15 minutes; wherein the combination of stripping parameters is selected so that the stripping factor "f" is greater than 0.6, where $f=KP_vS/PO$; and wherein K is between about 1 and about 200, and $P_v$ (the vapor pressure of the component to be stripped) is not more than about 0.1 mm Hg at 500° F. (277° C.) and not more than about 2.0 mm Hg at 600° F. (343° C.); and then
   (d) rapidly cooling the oil to a temperature below about 480° F. (249° C.); wherein the product of the process contains less than 2% high molecular weight materials and more than 37½% of the compounds deleterious to frylife have been removed.

12. A process according to claim 11 wherein the oil is stripped for not more than about 15 minutes at a temperature between 530° F. (293° C.) and 600° F. (316° C.).

13. A process according to claim 11 wherein the oil is stripped for not more than 5 minutes at a temperature between 560° F. (293° C.) and 600° F. (316° C.).

14. A process according to claim 11 wherein the oil is stripped for not more than about 1 minute, at a temperature between 600° F. (316° C.) and 650° F. (343° C.).

15. A process according to claim 11 wherein the oil of step (d) is rapidly cooled to between 370° F. (188° C.) and below about 480° F. (249° C.) in less than about one minute.

16. A process according to claim 11 wherein from about 0.5% to about 3% stripping medium by weight of the oil is used in step (c).

17. A process according to claim 16 wherein the stripping medium is steam.

18. A process according to claim 11 wherein the process of step (c) is a continuous process.

19. A process according to claim 11 wherein the edible oil is a vegetable oil.

20. A process according to claim 19 wherein the edible oil is selected from the group consisting of soybean oil, corn oil, sunflower seed oil, palm oil, peanut oil, rapeseed oil, and low erucic acid rapeseed oil, and mixtures thereof.

21. A process according to claim 1 wherein said stripping factor "f" is about 1.8 or greater.

22. A process according to claim 1 wherein said stripping factor "f" is 2.5 or greater.

23. A process according to claim 11 wherein said stripping factor "f" is about 1.8 or greater.

* * * * *